(12) United States Patent
Yajima et al.

(10) Patent No.: US 7,578,536 B2
(45) Date of Patent: *Aug. 25, 2009

(54) VEHICLE SEAT, VEHICLE SEAT STORAGE STRUCTURE AND VEHICLE SEAT STRUCTURE

(75) Inventors: Kiyoshi Yajima, Sagamihara (JP); Yuichi Tsukada, Rancho Palos Verdes, CA (US); Koji Kamida, Utsunomiya (JP); Hidetaka Shinozaki, Utsunomiya (JP); Tomotsu Oishi, Haga-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/041,043

(22) Filed: Mar. 3, 2008

(65) Prior Publication Data

US 2008/0157579 A1 Jul. 3, 2008

Related U.S. Application Data

(63) Continuation of application No. 10/544,977, filed as application No. PCT/JP2004/001428 on Feb. 10, 2004, now Pat. No. 7,393,038.

(30) Foreign Application Priority Data

Feb. 13, 2003 (JP) ............................. 2003-035206
Aug. 5, 2003 (JP) ............................. 2003-286715

(51) Int. Cl.
*B60N 2/12* (2006.01)
*B60N 2/30* (2006.01)

(52) U.S. Cl. ............... 296/65.03; 296/65.08; 296/65.11

(58) Field of Classification Search ............... 296/65.01, 296/65.03, 65.05, 65.09, 65.11, 65.13, 65.16, 296/65.18, 64, 69; 297/15, 331, 334, 378.12, 297/321, 378.1

See application file for complete search history.

(56) References Cited

U.S. PATENT DOCUMENTS 5,570,931 A * 11/1996 Kargilis et al. ......... 297/378.12

(Continued)

FOREIGN PATENT DOCUMENTS

DE 197 51 091 A1 5/1999

(Continued)

OTHER PUBLICATIONS

Notice of Reasons for Rejection issued Jun. 24, 2008 by the Japanese Patent Office in Japanese Patent Application No. 2003-286715.

*Primary Examiner*—Glenn Dayoan
*Assistant Examiner*—Gregory Blankenship
(74) *Attorney, Agent, or Firm*—Hamre, Schumann, Mueller & Larson, P.C.

(57) ABSTRACT

A vehicle seat is provided which includes a seat base detachably mounted on a vehicle floor, a seat cushion detachably provided on the seat base, and a backrest foldably supported on the seat base. The seat cushion is detached from the seat base, and the seat cushion and the seat base with the backrest folded are juxtaposed to be stored in a recess provided in the vehicle floor or an area under another seat. In the case of non-use, the vehicle seat can be removed from the vehicle floor to be efficiently stored inside a vehicle. A vehicle seat storing structure and a vehicle seat structure are also provided.

6 Claims, 15 Drawing Sheets

U.S. PATENT DOCUMENTS

| | | | |
|---|---|---|---|
| 5,593,208 A * | 1/1997 | Mitschelen et al. | 297/336 |
| 5,810,443 A | 9/1998 | Blanchard | |
| 5,979,964 A | 11/1999 | Ban et al. | |
| 6,010,190 A * | 1/2000 | Downey | 297/340 |
| 6,183,033 B1 * | 2/2001 | Arai et al. | 296/65.09 |
| 6,196,613 B1 * | 3/2001 | Arai | 296/65.13 |
| 6,270,140 B1 | 8/2001 | Opfer et al. | |
| 6,364,931 B1 | 4/2002 | Robinson et al. | |
| 6,371,556 B1 * | 4/2002 | Arai | 297/331 |
| 6,488,327 B1 | 12/2002 | Pearse et al. | |
| 6,595,587 B2 * | 7/2003 | Konishi et al. | 297/331 |
| 6,601,901 B1 * | 8/2003 | Schambre et al. | 296/65.09 |
| 6,682,120 B2 | 1/2004 | Kamida et al. | |
| 6,811,200 B2 | 11/2004 | Shibata et al. | |
| 6,955,386 B2 | 10/2005 | Rhodes et al. | |
| 6,986,542 B2 | 1/2006 | Imajo et al. | |
| 7,040,685 B2 | 5/2006 | Sumida et al. | |
| 7,137,663 B2 | 11/2006 | Tsujibayashi et al. | |
| 2002/0011737 A1 | 1/2002 | Miyahara et al. | |
| 2003/0094830 A1 | 5/2003 | Kamida et al. | |
| 2003/0151294 A1 | 8/2003 | Glater | |

FOREIGN PATENT DOCUMENTS

| | | |
|---|---|---|
| DE | 100 57 450 A1 | 5/2002 |
| EP | 1 000 855 A2 | 5/2000 |
| FR | 2 698 832 A1 | 6/1994 |
| JP | 57-84233 A | 5/1982 |
| JP | 62-17447 U | 2/1987 |
| JP | 6-320991 A | 11/1994 |
| JP | 8-67186 A | 12/1996 |
| JP | 11-147432 A | 6/1999 |
| JP | 2001-334857 A | 12/2001 |
| JP | 2002-293179 A | 10/2002 |
| JP | 2002-337580 A | 11/2002 |
| JP | 3356970 B2 | 10/2004 |
| WO | WO 99/0337 A1 | 1/1999 |

* cited by examiner

VEHICLE SEAT, VEHICLE SEAT STORAGE STRUCTURE AND VEHICLE SEAT STRUCTURE

This application is a Continuation of U.S. application Ser. No. 10/544,977, filed Mar. 3, 2006, which is a 371 National Stage Application of International Application Serial Number PCT/JP2004/001428, filed Feb. 10, 2004, which are incorporated herein by reference.

TECHNICAL FIELD

The present invention relates to a vehicle seat which may be removed from a vehicle floor and stored inside a vehicle when not in use, a vehicle seat storage structure, and a vehicle seat structure.

BACKGROUND ART

There is a technique in which a seat can be detachably mounted at a plurality of positions on a vehicle floor such that the position of the seat is altered in accordance with service conditions (for example, Japanese Patent No. 3356970).

With such a structure that allows a seat to be detachably mounted on a vehicle floor, a new space may be secured in a vehicle cabin by removing the seat. In the above technique, however, because the seat is made detachably mountable for the purpose of changing its position, and not for the purpose of securing a new space inside the vehicle cabin through the removal of the seat, no consideration is naturally given to the storage of the removed seat. As a result, there has been a problem that, if a seat was removed to secure a new space inside the vehicle cabin and if the removed seat was stored in a trunk space or the like with other baggage, the trunk space was reduced by a corresponding amount. In addition, if the removed seat was not stored in the vehicle, but in a garage or the like so as to secure the trunk space, a disadvantage arose in that the seat could not be used when needed.

Thus, it is an object of the present invention to provide a vehicle seat which is removable from a vehicle floor and which may be stored efficiently in a vehicle when not in use, as well as a vehicle seat storage structure and a vehicle seat structure.

DISCLOSURE OF THE INVENTION

In order to attain the above object, according to an aspect of the present invention, there is provided a vehicle seat comprising: a seat base detachably mounted on a vehicle floor; a seat cushion detachably provided on the seat base; and a backrest foldably supported on the seat base.

With the structure as mentioned above, if, after removal of the vehicle seat from the vehicle floor, the seat cushion is detached from the seat base and the backrest is folded toward the seat base, the thickness will be suppressed approximately by the amount corresponding to the thickness of the seat cushion. By storing the seat base with the backrest folded in a juxtaposed manner with the removed seat cushion, storage can be made in an area having a restricted height such as a recess in the vehicle floor or an area under another seat. Thus, in the case of non-use, the vehicle seat can be removed from the vehicle floor and efficiently stored inside a vehicle.

Preferably, an axis around which the backrest rotates to be folded is located downwardly of a bearing surface of the seat cushion when the seat cushion is provided on the seat base.

With the structure as mentioned above, because the rotation axis of the backrest is located at a lower side of the bearing surface of the seat cushion when the seat cushion is mounted on the seat base, a reduction can be made in the thickness of the seat base and the backrest when the seat cushion is removed and the backrest is folded toward the seat base. Thus, the removed vehicle seat can be further efficiently stored inside a vehicle.

Preferably, the seat base has a foldable leg at an underside thereof and is detachably mounted at the foldable leg on the vehicle floor.

With the structure as mentioned above, if, after removal of the vehicle seat from the vehicle floor, the seat cushion is detached from the seat base, and the backrest is folded toward the seat base and the foldable leg at the underside of the seat base is folded, the thickness will be suppressed approximately by the amount corresponding to the height of the foldable leg and the thickness of the seat cushion. By storing the seat base with the backrest folded and the leg folded in a juxtaposed manner with the removed seat cushion, storage can be made in an area having a restricted height such as a recess in the vehicle floor or an area under another seat. Thus, the removed vehicle seat can be further efficiently stored inside a vehicle.

Preferably, the seat base has a pair of the foldable legs at the underside thereof and the pair of legs rotate in the same direction in which they are to be folded.

With the structure as mentioned above, because the pair of legs are rotated in the same direction in which they are to be folded, they can be folded without interference with each other irrespective of their lengths.

Preferably, the backrest is provided on the back thereof with a tray.

With the structure as mentioned above, because a tray is proved on the back of the backrest, if, without removing the vehicle seat from the vehicle floor, the seat cushion is detached from the seat base and the backrest is folded toward the seat base, the tray on the back of the backrest faces upwardly to be used. Thus, because the seat cushion is removed for the backrest to be folded, the backrest and thus the tray become stable, making it possible for things to be securely placed on the tray.

According to another aspect of the present invention, there is provided a vehicle seat storing structure comprising: a first vehicle seat having a seat base detachably mounted on a vehicle floor, a seat cushion detachably provided on the seat base, and a backrest foldably supported on the seat base; and a recess provided in the vehicle floor or an area under a second vehicle seat, wherein the seat cushion is removed from the seat base, and the seat cushion and the seat base with the backrest folded are juxtaposed to be stored in the recess or the area under the second vehicle seat.

With the structure as mentioned above, if, after removal of the first vehicle seat from the vehicle floor, the seat cushion is detached from the seat base and the backrest is folded toward the seat base, the thickness will be suppressed approximately by the amount corresponding to the thickness of the seat cushion. The seat base with the backrest folded and the removed seat cushion are stored in a juxtaposed manner in the recess provided in the vehicle floor or the area under the second seat that has a restricted height. Thus, the first vehicle seat, in the case of non-use, can be removed from the vehicle floor and efficiently stored inside a vehicle.

Preferably, the seat base has a foldable leg at an underside thereof and is detachably mounted at the foldable leg on the vehicle floor, and when the seat cushion is removed from the seat base, the seat cushion and the seat base with the backrest folded and with the foldable leg folded are juxtaposed to be stored in the recess or the area under the second vehicle seat.

With the structure as mentioned above, if, after removal of the first vehicle seat from the vehicle floor, the seat cushion is detached from the seat base, and the backrest is folded toward the seat base and the foldable leg at the underside of the seat base is folded, the thickness will be suppressed approximately by the amount corresponding to the height of the foldable leg and the thickness of the seat cushion. The seat base with the backrest folded and the leg folded and the removed seat cushion are stored in a juxtaposed manner in the recess provided in the vehicle floor or the area under the second seat that has a restricted height. Thus, the first vehicle seat, in the case of non-use, can be removed from the vehicle floor and can be further efficiently stored inside a vehicle.

Preferably, the seat base has a pair of the foldable legs at the underside thereof, and the pair of the foldable legs rotate in a same direction to be folded.

With the structure as mentioned above, because the pair of legs are rotated in the same direction in which they are to be folded, they can be folded without interference with each other irrespective of their lengths.

Preferably, the seat cushion and the seat base with the backrest folded are stored in the recess or the area under the second vehicle seat, with their thickness directions directed in a vertical direction.

With the structure as mentioned above, the seat cushion and the seat base with the backrest folded are juxtaposed with their thickness directions directed in the vertical direction to be stored in the recess in the vehicle floor or the area under the second vehicle seat that has a restricted height. Thus, the removed vehicle seat can be further efficiently stored inside a vehicle.

Preferably, an axis around which the backrest rotates to be folded is located downwardly of a bearing surface of the seat cushion when the seat cushion is provided on the seat base.

With the structure as mentioned above, because the rotation axis of the backrest is located at a lower side of the bearing surface of the seat cushion when the seat cushion is mounted on the seat base, a reduction can be made in the thickness of the seat base and the backrest when the seat cushion is removed and the backrest is folded toward the seat base. Thus, the removed vehicle seat can be further efficiently stored inside a vehicle.

According to a further aspect of the present invention, there is provided a vehicle seat structure comprising: a vehicle seat as mentioned above that is mounted at a center in a width direction of a vehicle; a lateral seat provided on both sides of the vehicle seat in the width direction of the vehicle; and a locking element that guides either one of the lateral seats to be shifted in the width direction of the vehicle and locks the either one of the lateral seats in position, wherein the vehicle seat is lockable with the locking element to be disposed between the lateral seats spaced apart in the width direction of the vehicle, and with the vehicle seat removed from the locking element, the either one of the lateral seats, guided by the locking element, is movable closer to an opposite one of the lateral seats and is lockable with the locking element.

With the structure as mentioned above, by disposing the central vehicle seat between the lateral seats on both sides in the width direction of the vehicle and locking the central vehicle seat with the locking element, it becomes possible for three occupants to take their respective seats in this row. On the other hand, by detaching the central vehicle seat from the locking element, and by guiding either one of the lateral seats along the locking element to be shifted toward the other lateral seat and then locking the either one of the lateral seats with the locking element, it becomes possible for two occupants to take their respective seats and for occupants to walk through the space formed on the side of the either one of the lateral seats opposite the other lateral seat. In addition, the central vehicle seat is lockable with the locking element along which the either one of the lateral seats is guided in the width direction of the vehicle and with which the either one of the lateral seats locks to be placed in position. Thus, the locking element is shared, thereby leading to a reduction in the cost.

BEST MODES TO CARRY OUT THE INVENTION

A first embodiment of the present invention will now be described with reference to FIGS. 1 through 14.

Figure 1:
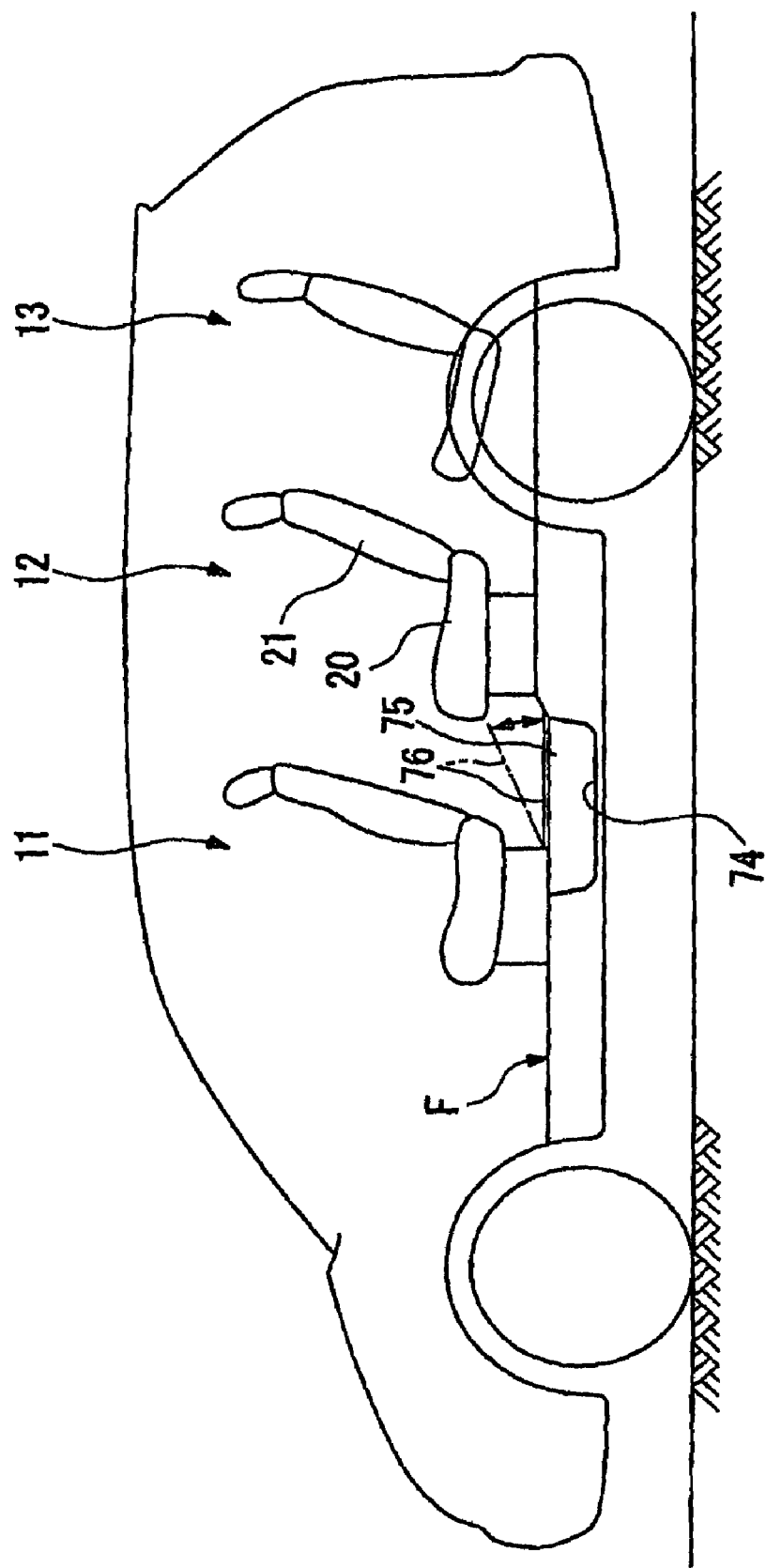
FIG. 1 is a schematic side view of a vehicle to which a first embodiment of the present invention is applied.

FIG. 1 shows an example of a vehicle to which the first embodiment of the present invention has been applied, the vehicle being of a hatchback type and including three rows of seats front and back.

Figure 2:
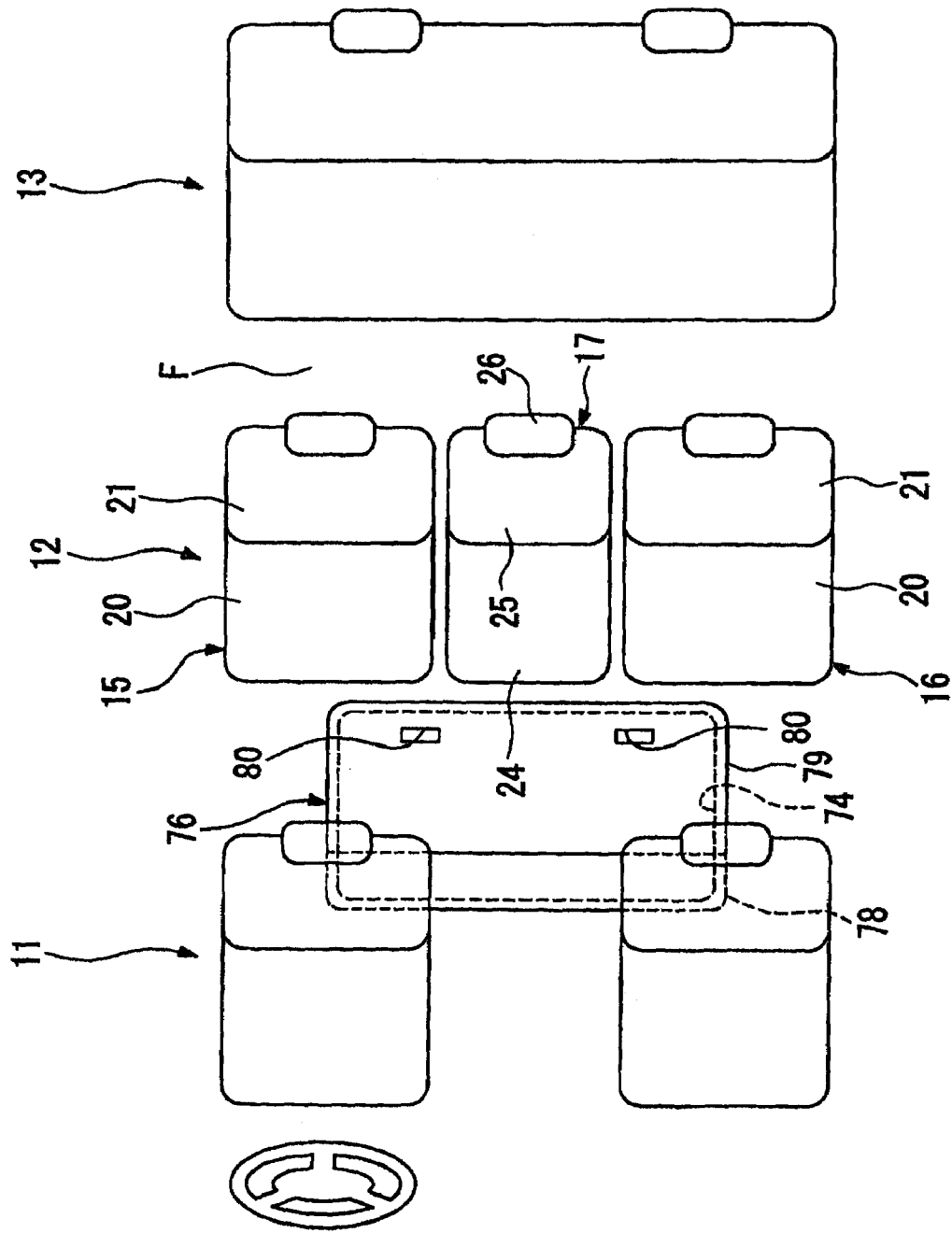
FIG. 2 is a plan view of a vehicle interior to which the embodiment of the present invention is applied.
Figure 3:
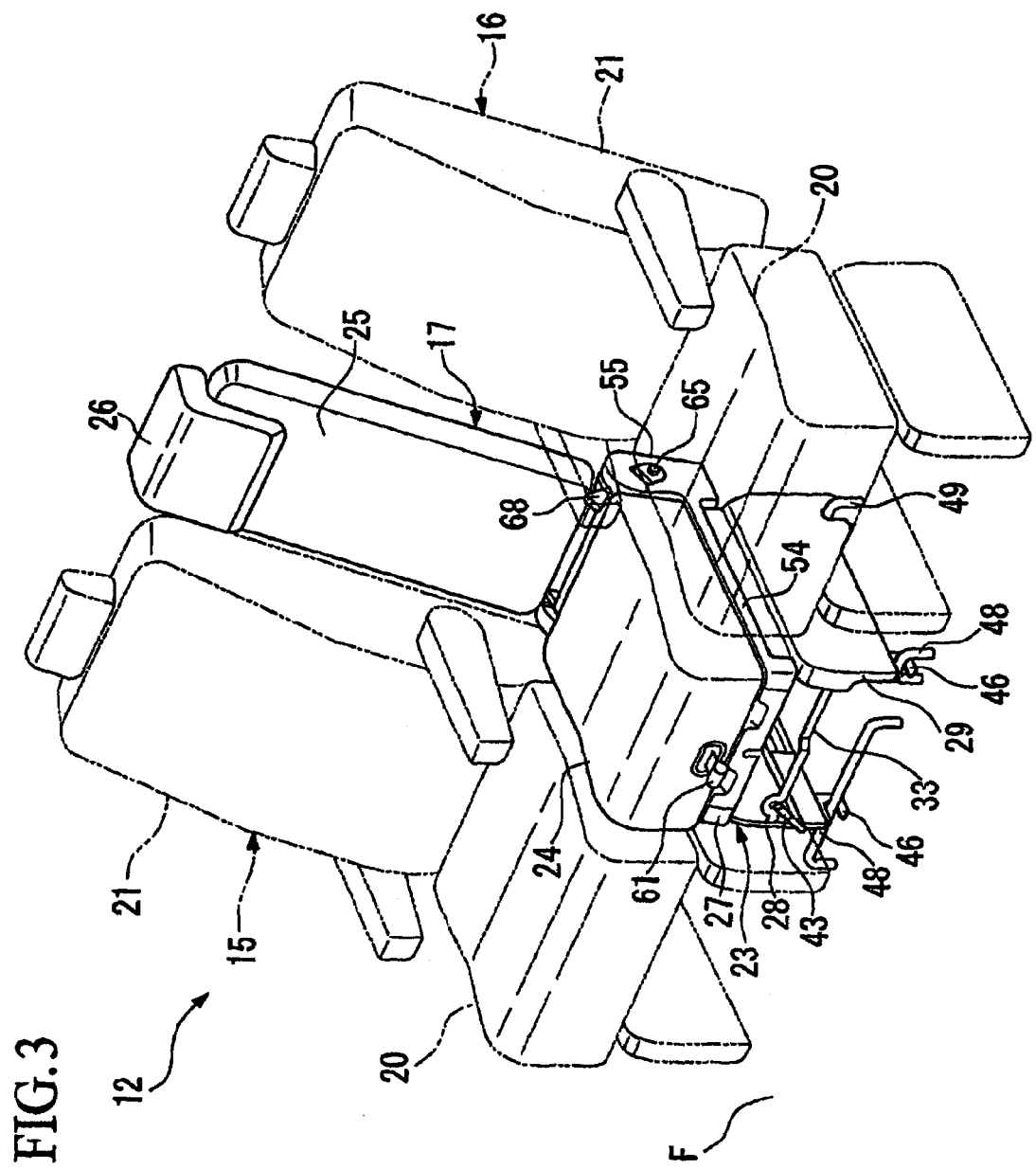
FIG. 3 is a perspective view of a second row of seats including a central seat to which the embodiment of the present invention is applied.

As shown in FIGS. 1 and 2, this vehicle has a vehicle floor F, and a first row of seats 11, a second row of seats 12 and a third seat 13 disposed front to back on the vehicle floor F. The present embodiment is applied to the second row of seats 12 of the vehicle, and more specifically to the central vehicle seat 17 in the second row of seats 12, located between a right-side lateral seat 15 and a left-side lateral seat 16, the central seat 17 being shown in FIGS. 2 and 3. The present embodiment, however, is not limited in its application to the central seat 17 of the second row of seats 12 and is of course applicable to any seat. Here, the third seat 13 is a so-called bench seat.

The lateral seats 15 and 16 each has a seat cushion 20 that primarily supports the buttocks of an occupant and a seat back 21 that stands upright at a rear end side of the seat cushion 20 to primarily support the back of the occupant. The seat back 21 is supported at the side of the seat cushion 20 to be rockable around an axis extending in a left and right direction such that its so-called reclining angle is adjustable. In addition, each of the lateral seats 15 and 16 is slidable front and back relative to the vehicle floor F.

Figure 4:
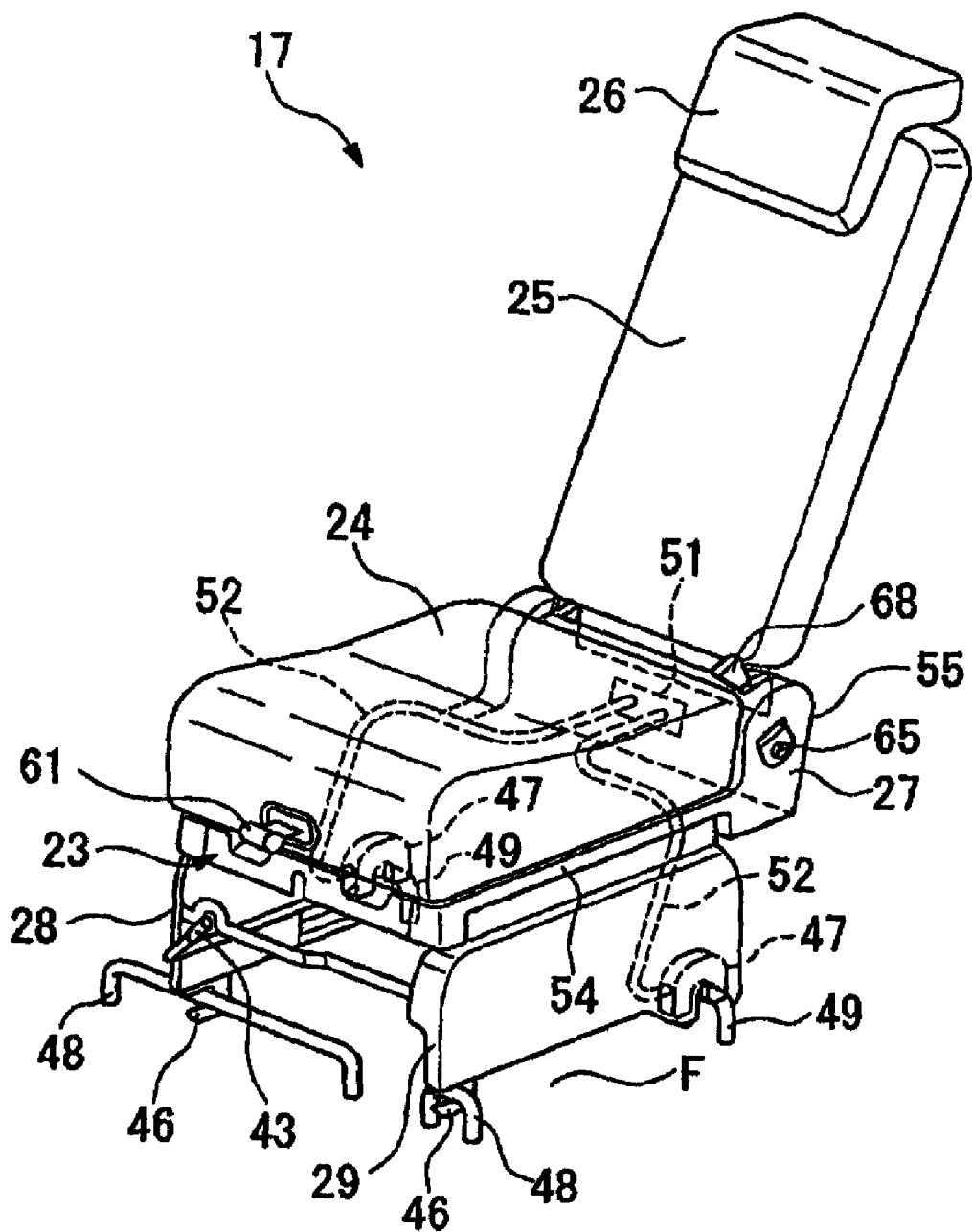
FIG. 4 is a perspective view of the central seat to which the embodiment of the present invention is applied.

The central seat 17 has a smaller width than the lateral seats 15 and 16 on its both sides and is detachably mounted on the vehicle floor F. The central seat 17, as also shown in FIG. 4, has a lower-part-constituting seat base 23, a seat cushion 24 supported on the seat base 23 to primarily support the buttocks of an occupant, and a backrest 25 including a headrest 26 supported on the seat base 23 to primarily support the back of the occupant.

The seat base 23 has a seat base body 27 that supports the seat cushion 24 and the backrest 25, and a pair of left and right seat legs 28 and 29 provided to extend downwardly from both left and right sides of the seat base body 27, the seat base 23 being mounted at the seat legs 28 and 29 on the vehicle floor F. The seat legs 28 and 29 are detachably mountable on the vehicle floor F and are further rotatable centered at the side of the seat base body 27 to be folded. In other words, the seat legs 28 and 29 are rotatable between the normal position as shown in FIGS. 4 and 5 in which they extend vertically downwardly from the seat base body 27 and the folded position as shown in FIG. 6 in which they are rotated in the same direction to bring their tip end sides closer to the seat base body 27.

Furthermore, the seat legs 28 and 29 are fixable to and detachable from the seat base body 27 in that normal position and are fixed to the seat base body 27 in the normal position to be mounted on the vehicle floor F.

Incidentally, a description will be made of the central seat 17, with it as in the state mounted on the vehicle floor F in that position unless otherwise mentioned.

Figure 5:
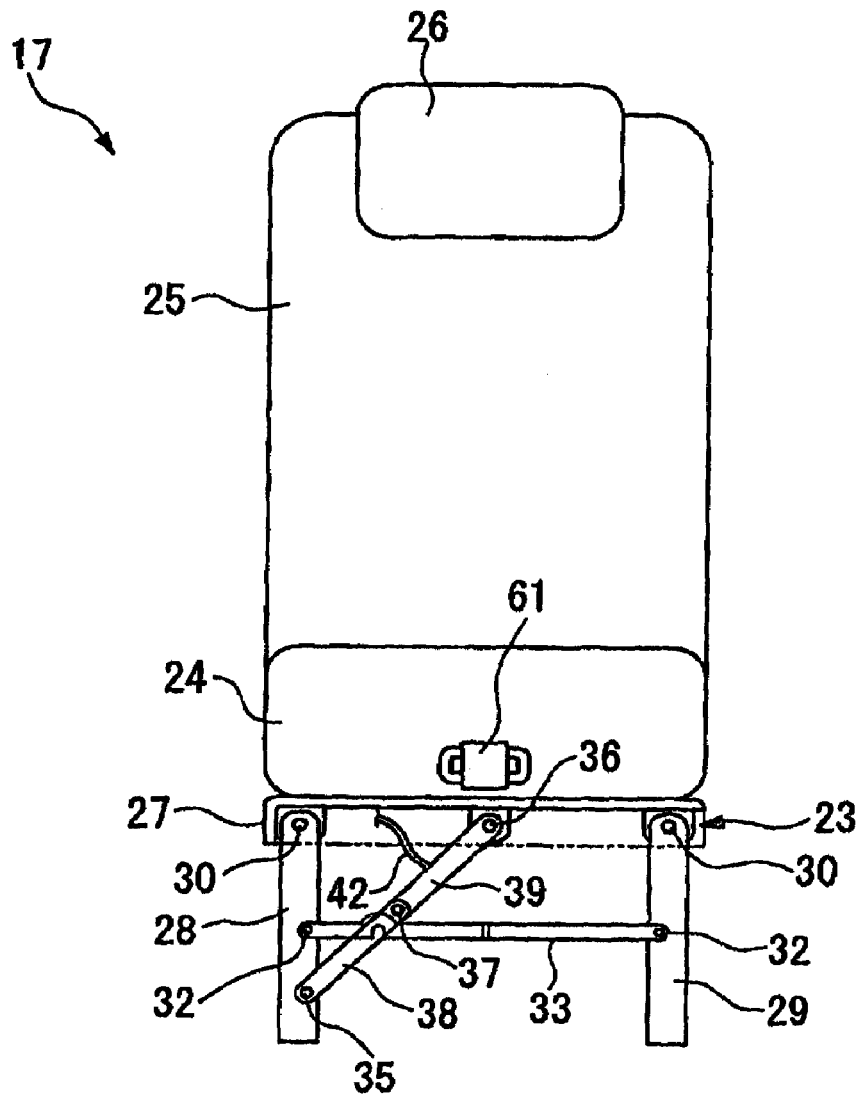
FIG. 5 is a front view of the central seat to which the embodiment of the present invention is applied.
Figure 6:
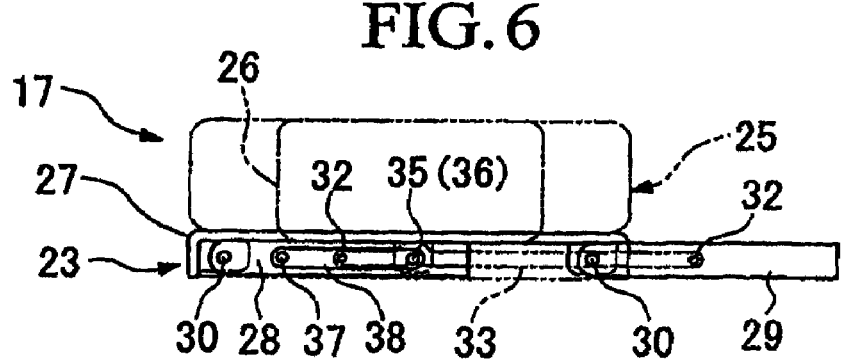
FIG. 6 is a front view of the central seat to which the embodiment of the present invention is applied, shown with a seat cushion removed, a backrest folded forwardly, and seat legs folded.

As shown in FIG. 5, a rotation shaft 30 is provided at both left and right sides of the seat base 23 to extend front and back, and the seat leg 28, 29 is rotatably supported at its upper side on the relevant rotation shaft 30. The seat legs 28 and 29 each is provided at a lower portion thereof, at the same height, with a rotation shaft 32 having its axis extending front and back, and a left-and-right extending connection link 33 is rotatably coupled to and connects these rotation shafts 32.

In addition, a rotation shaft 35 with an axis extending front and back is provided at a lower side of the rotation shaft 32 of one seat leg 28, and a rotation axis 36 with an axis extending front-and-back is provided also at a lower side of the center in the left and right direction of the seat base body 27. A pair of foldable links 38 and 39, which are rotatably coupled to each other via a rotation shaft 37 with an axis extending front and back, are rotatably coupled to the rotation shafts 35 and 36, respectively, so as to connect the rotation shafts 35 and 36.

Figure 7:
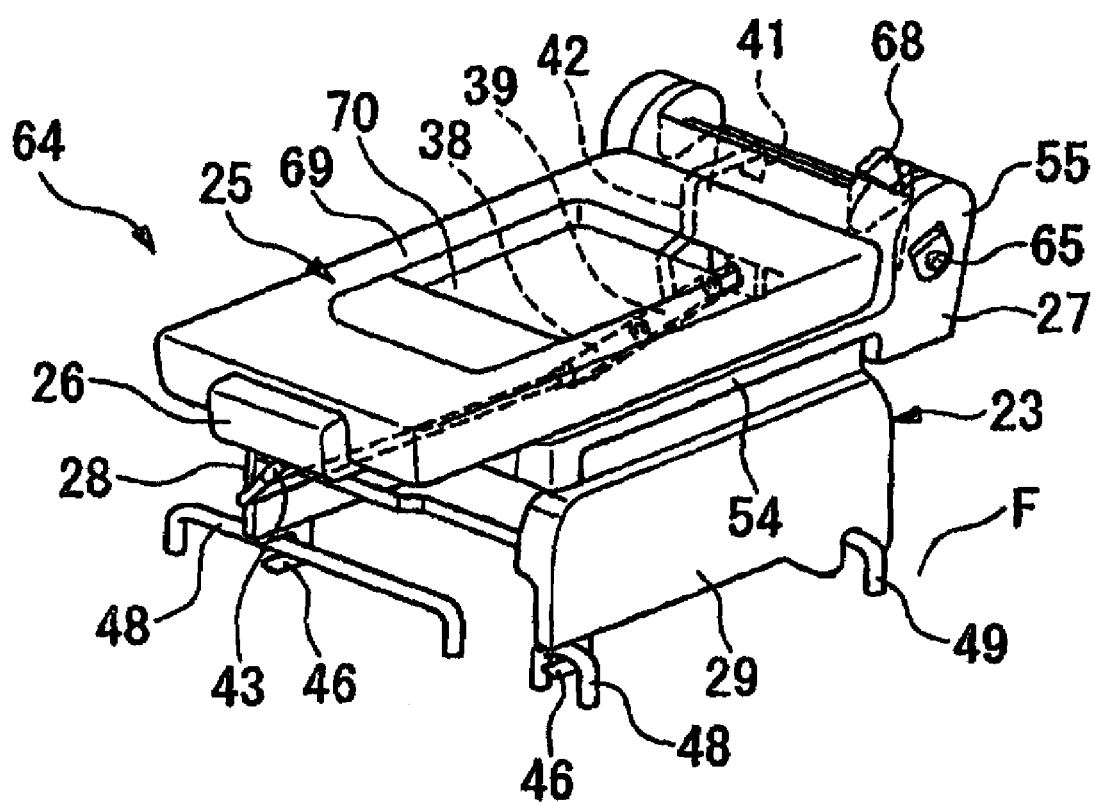
FIG. 7 is a perspective view of the central seat to which the embodiment of the present invention is applied, shown with the seat cushion removed and the backrest folded forwardly.

With the central seat 17 having been removed from the vehicle floor F and with its seat legs 28 and 29 in the normal position, if one foldable link 39 is pulled via a cable 42 by manually pulling a posterior folding lever 41 provided, as shown in FIG. 7, on a rear surface of the seat base body 27, the pair of foldable links 38 and 39 are folded centering around the rotation shaft 37. As a result, the distance between the rotation shaft 35 and the rotation shaft 36 is shortened such that the right-side seat leg 28 rotates in the approaching direction to the seat base body 27 to be folded, and likewise the left-side seat leg 29 rotates, via the connection link 33, in the same direction to be folded as shown in FIG. 6. As shown in FIG. 7, the rotation shaft 35 is constructed of a rear end portion of an anterior folding lever 43 that extends forwardly along an inner side of the seat leg 28, and the foldable links 38 and 39 may be folded by pulling the anterior folding lever 43 to rotate the foldable link 38.

Figure 9:
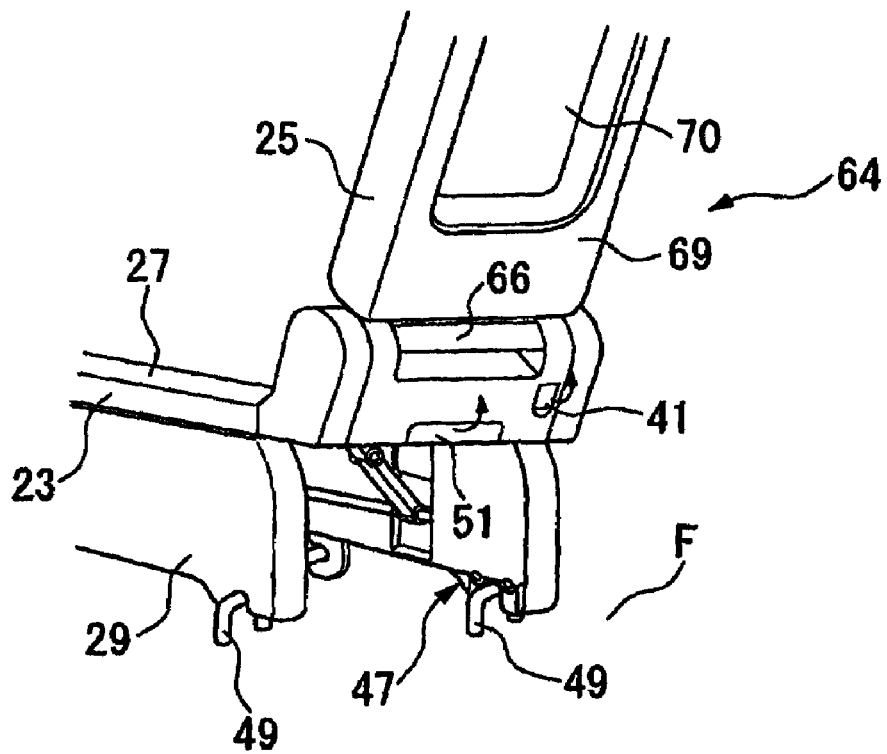
FIG. 9 is a perspective view of the central seat to which the embodiment of the present invention is applied, viewed from a rear side.

Each seat leg 28, 29, as shown in FIG. 4, is provided at a front and rear portion of its side opposite the rotation shaft 30 with a hook 46 and a locking mechanism 47, respectively, such that with the hook 46 locked to an anterior locking portion 48 fixed to the vehicle floor F, the locking mechanism 47 can couple with and decouple from a relevant posterior locking portion 49 fixed to the vehicle floor F. In other words, with the hook 46 locked to the anterior locking portion 48, the locking mechanism 47 is pressed against the relevant posterior locking portion 49 from above until it locks therewith so as to fix the central seat 17 to the vehicle floor F. The locking mechanisms 47 may be released from the posterior locking portions 49 by manually pulling a disconnection lever 51 provided, as shown in FIGS. 4 and 9, on the rear surface of the seat base body 27 and actuating the locking mechanisms 47 through cables 52. With the locking mechanisms 47 released, the central seat 17 is fully removable from the vehicle floor F.

Figure 8:
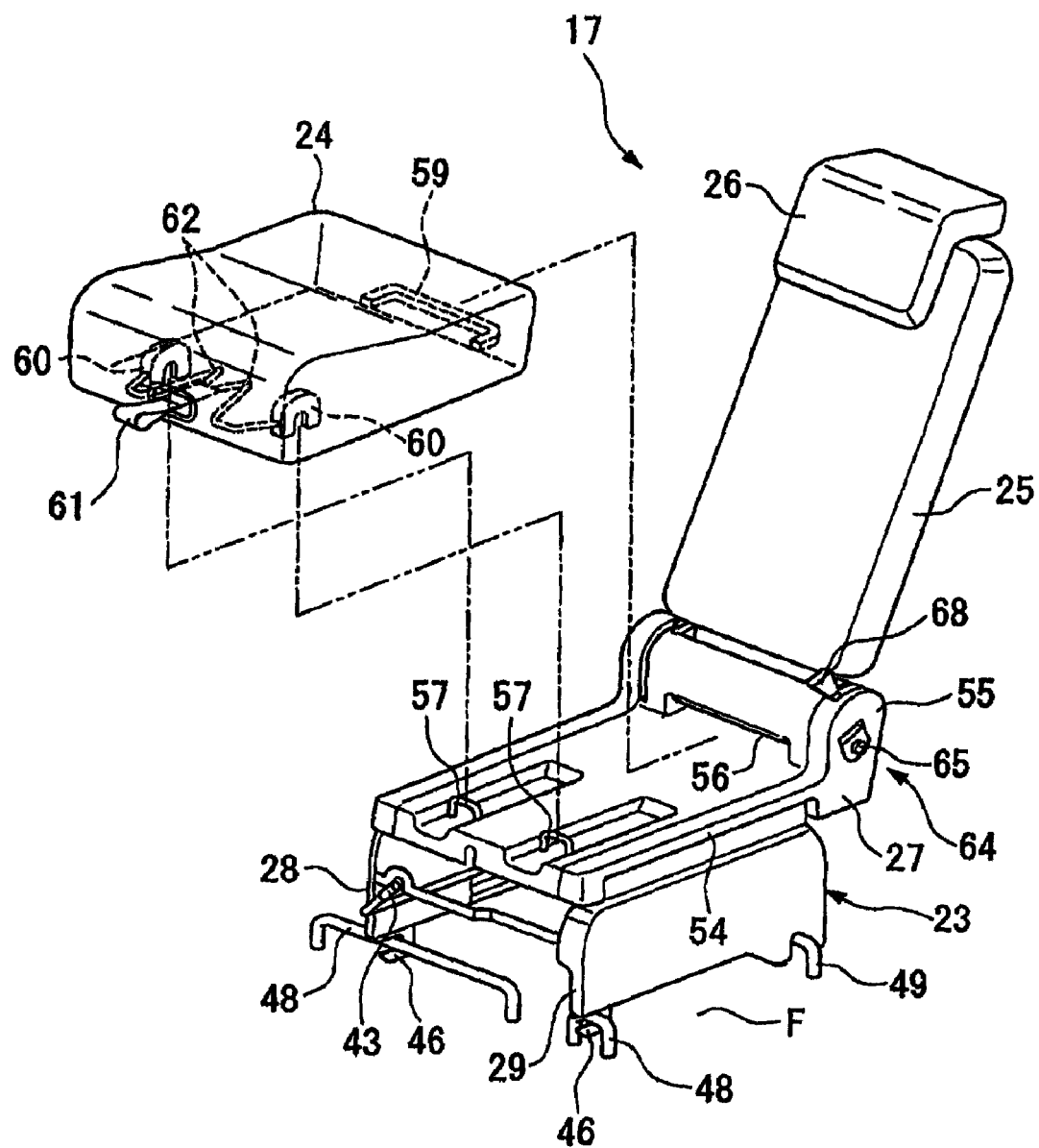
FIG. 8 is a perspective view of the central seat to which the embodiment of the present invention is applied, with the seat cushion removed.

The seat cushion 24, as shown in FIG. 8, is detachably provided on the seat base body 27. The seat base body 27 has a substantially planar base portion 54, and a seat back support 55 that projects upwardly in a convex shape at a rear portion of the base portion 54 and supports the seat back 21. An engagement recess 56 is formed at a front lower end of the seat back support 55, the engagement recess being dented backwardly. In addition, a locking portion 57 is provided at two positions, the left position and the right position, at a front side of the upper surface of the base portion 54.

In correspondence with the above, the seat cushion 24 is provided at a rear lower end with a backwardly-projecting engagement hook 59 and at a front side of its lower surface with two locking mechanisms, the left locking mechanism 60 and the right locking mechanism 60. With the engagement hook 59 of the seat cushion 24 inserted into the engagement recess 56 of the seat base body 27, the locking mechanisms 60 can couple with and decouple from the locking portions 57 of the seat base body 27. In other words, if, with the engagement hook 59 inserted into the engagement recess 56, the locking mechanisms 60 are pressed against the locking portions 57 from above, the locking mechanisms 60 couple with the locking portions 57, so as to fix the seat cushion 24 to the seat base body 27. The locking mechanisms 60 are released from the locking portions 57 by manually pulling a lock release strap 61 projecting at the front side of the seat base body 27 and actuating the locking mechanisms 60 through cables 62. With the locking mechanisms 60 released, the seat cushion 24 is removed from the seat base 23.

The central seat 17 with the seat cushion 24 removed therefrom and including only the seat base 23 and the backrest 25 will be hereinafter referred to as a cushion-detached body 64.

A rotation shaft 65 extends left and right in the seat back support 55 of the seat base body 27, and the backrest 25 is rotatably supported at one end thereof on the rotation shaft 65.

Figure 10:
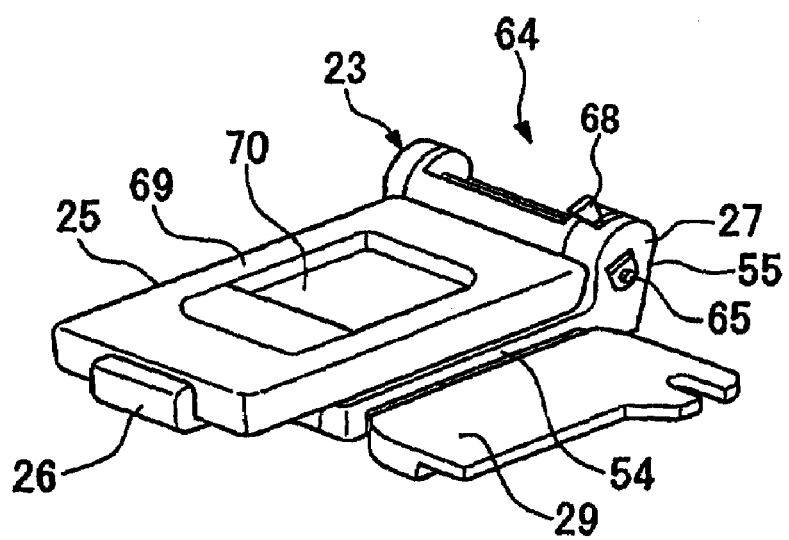
FIG. 10 is a perspective view of the central seat to which the embodiment of the present invention is applied, shown with the seat cushion removed, the backrest folded forwardly, and the seat legs folded.
Figure 11:
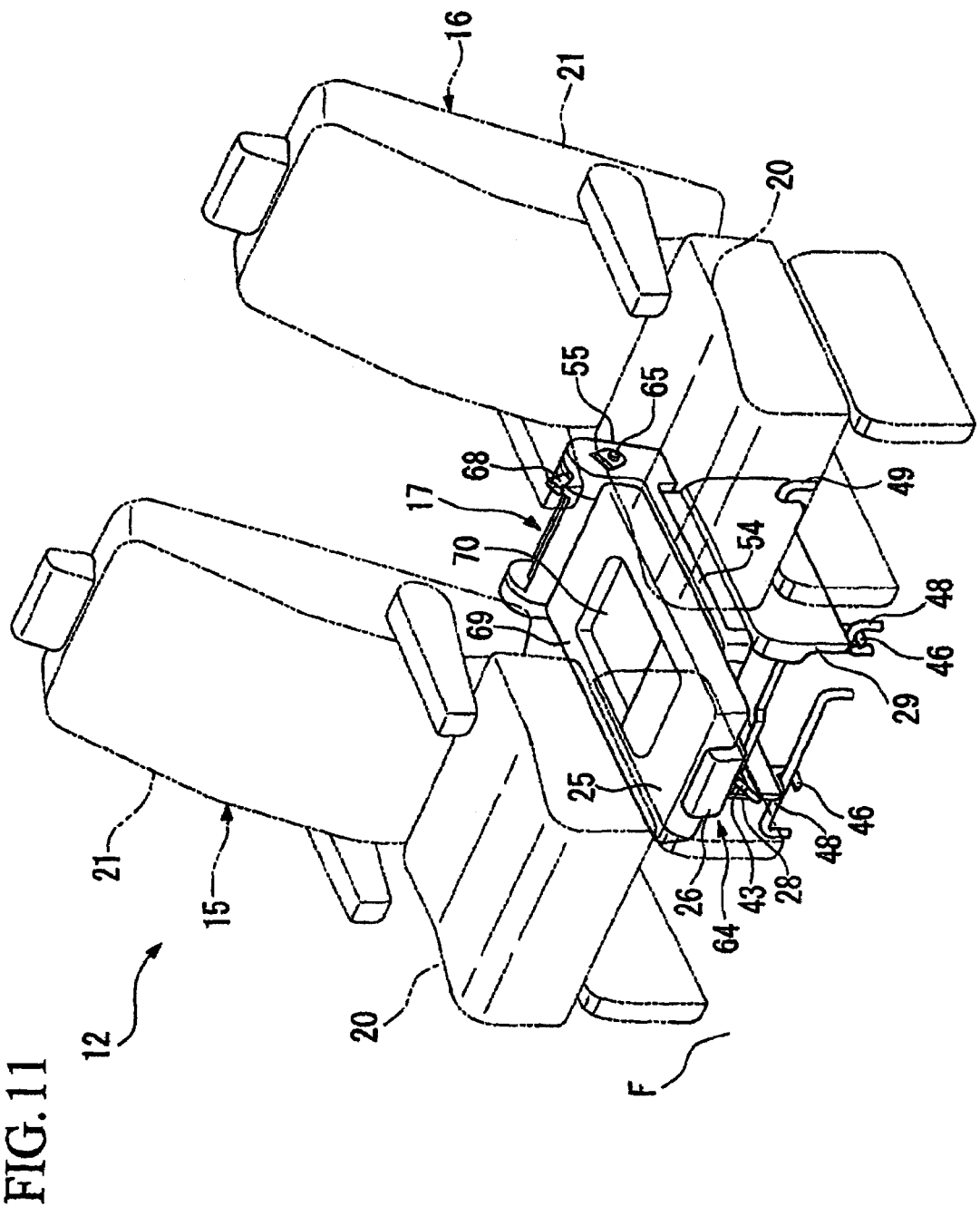
FIG. 11 is a perspective view of the second row of seats including the central seat to which the embodiment of the present invention is applied, shown with the seat cushion of the central seat removed and the backrest folded forwardly.

The backrest 25 is rotatable between an erected position as best seen in FIGS. 4, 8 and 9 in which it stands upright from the seat base 23 and a forwardly folded position as shown in FIGS. 7, 10 and 11 in which the seat cushion 20 has been removed and the backrest 25 is in contact with the base portion 54 of the seat base 23. Here, the rotation shaft 65 is located at a height from the base portion 54 lower than the bearing surface (upper surface) of the seat cushion 24 mounted on the seat base 23. As a result, the backrest 25, when in that forwardly folded position, comes into contact with substantially the entire surface of the base portion 54 of the seat base 23 from which the seat cushion 24 has been removed. That is, the backrest 25 is foldable relative to the seat base 23. The height of the backrest 25 from the base portion 54 in this forwardly-folded position is equal to or less than the height of the seat cushion 24 from the base portion 54 when the seat cushion 24 is mounted in place. The seat back support 55 is provided at the rear with a grip 66 (FIG. 9) whereat to hold when carrying the cushion-detached body 64.

The backrest 25 can be fixed at a plurality of angular positions to the seat base body 27 in the above erected position, i.e., its reclining angle can be adjusted, and the backrest 25 is normally urged in the direction of the forwardly-folded position with a spring (not shown).

The backrest 25 is fixed in the erected position to the seat base body 27, and if a pull is manually given at a recliner-operating lever 68 located at a lateral upper side of the seat back support 55 with an occupant seated, the backrest 25 is unfixed from the seat base body 27 such that the reclining angle is adjustable so as to conform to the occupant posture.

Furthermore, the backrest 25 is fixed in the erected position to the seat base body 27, and if a pull is manually given at the recliner-operating lever 68 located at the lateral upper side of the seat back support 55 with an occupant not seated, the backrest 25 is unfixed from the seat base body 27 such that it is folded forwardly by the urging force of the spring (not shown) into the forwardly-folded position where it lies on the base portion 54 when the seat cushion 24 has been removed.

A tray 70 is provided in concave form on the back 69 of the backrest 25. In addition, it is set such that the headrest 26 of the backrest 25 does not protrude beyond the back 69 of the backrest 25 in a direction perpendicular to the back 69.

The central seat 17 as mentioned above, when allowing an occupant to sit down thereon, is secured to the vehicle floor F through the seat legs 28 and 29 in the normal position as shown in FIG. 4, and the backrest 25 is put in the erected position.

When the central seat 17 is not used, for example, the seat cushion 24 is removed from the seat base 23 as shown in FIG. 8 by pulling the lock release strap 61, and in the remaining cushion-detached body 64, the recliner-operating lever 68 is pulled such that the backrest 25 is put in the forwardly-folded position, and the tray 70 provided on the back 69 of the backrest 25, as shown in FIG. 11, faces upwardly and may be used. The occupant on the lateral seats 15 and 16 in the second row of seats 11 mainly uses the tray 70 to place things thereon or the like.

Furthermore, when the central seat 17 is removed, for example, to provide a passage between the lateral seats 15 and 16 in the second row of seats 12 enabling a walk-through of occupants between the first or second row of seats 11 or 12 and the third row of seats 13, for example, the disconnection lever 51 as shown in FIG. 9 is pulled to decouple the seat legs 28 and 29 from the vehicle floor F and allow the central seat 17 to be removed from the vehicle floor F. A passage may thus be formed between the lateral seats 15 and 16.

Figure 12:
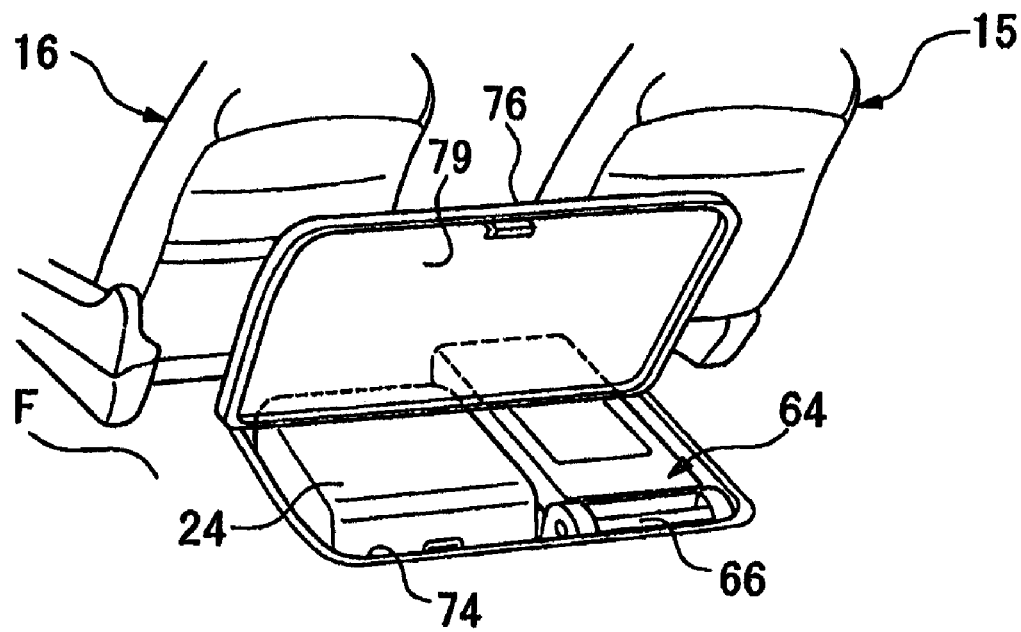
FIG. 12 is a perspective view of the central seat to which the embodiment of the present invention is applied, shown stored in a recess and viewed from a rear side.

The thus removed central seat 17 may be separated into the seat cushion 24 and the cushion-detached body 64 as shown in FIG. 8 by pulling the lock release strap 61 and removing the seat cushion 24 from the seat base 23. In the cushion-detached body 64, the recliner-operating lever 68 is further pulled to allow the backrest 25 to fall forwardly to the seat base 23 into the folded position, and the anterior folding lever 43 or the posterior folding lever 41 is pulled to fold the seat legs 28 and 29 relative to the seat base body 27 (FIG. 6). Thereafter, as shown in FIG. 12, the seat cushion 24 and the seat base 23 with the backrest 25 folded, i.e., the cushion-detached body 64 are stored in a juxtaposed manner in a recess 74 provided in the vehicle floor F. Note that in the case in which the tray 70 is used and the central seat 17 must be left between the lateral seats 15 and 16, only the seat cushion 24 is stored in the recess 74.

The recess 74 will next be described.

As shown in FIG. 1, at that part of the vehicle floor F which is located between the first row of seats 11 and the second row of seats 12, at the center in the left and right direction, the recess 74, which has a substantially rectangular shape in top view, is formed below the surface of the vehicle floor F. The recess 74 is longer in the left and right direction than in the front and back direction.

A floor lid 76 is attached to cover the entire of an upper opening 75 of the recess 74 and to be opened and closed as shown in FIG. 2. The floor lid 76 is made up of a front plate 78 that covers a front entire portion in the left and right direction of the upper opening 75 of the recess 74, and a rear plate 79 rockably coupled to the rear end of the front plate 78 and extending backwardly.

The front plate 78 of the floor lid 76 is rigidly fixed to the vehicle floor F and always covers the front portion of the upper opening 75 of the recess 74.

The rear plate 79 of the floor lid 76 is coupled to the rear end of the front plate 78 to be rockable within an upper-side rocking sphere relative to the front plate 78 fixed to the vehicle floor F. The rear plate 79 is provided at the side opposite the front plate 78 with left and right grips 80 that are held at when opening and closing the rear plate 79.

As mentioned above, from the central seat 17 having been removed from the vehicle floor F, the seat cushion 24 is removed by pulling the lock release strap 61. Thereafter, in the cushion-detached body 64, the recliner-operating lever 68 is pulled to put the backrest 25 into the forwardly-folded position, and the anterior folding lever 43 or the posterior folding lever 41 is pulled to rotate the seat legs 28 and 29 relative to the seat base body 27 into the folded position (FIG. 10). The cushion-detached body 64 thus folded is suppressed in height from the seat legs 28 and 29 at one side to the backrest 25 at the opposite side in the thickness direction of the cushion-detached body 64.

As shown in FIG. 12, with the rear plate 79 of the floor lid 76 kept at an upwardly-rotated position to open the rear side of the upper opening 75 of the recess 74, the thus folded cushion-detached body 64 is held at the grip 66 and inserted, with the side opposite the grip 66 first, into the recess 74. The seat cushion 24 is also inserted into the recess 74 to be juxtaposed by the cushion-detached body 64 in the left and right direction.

Figure 13:
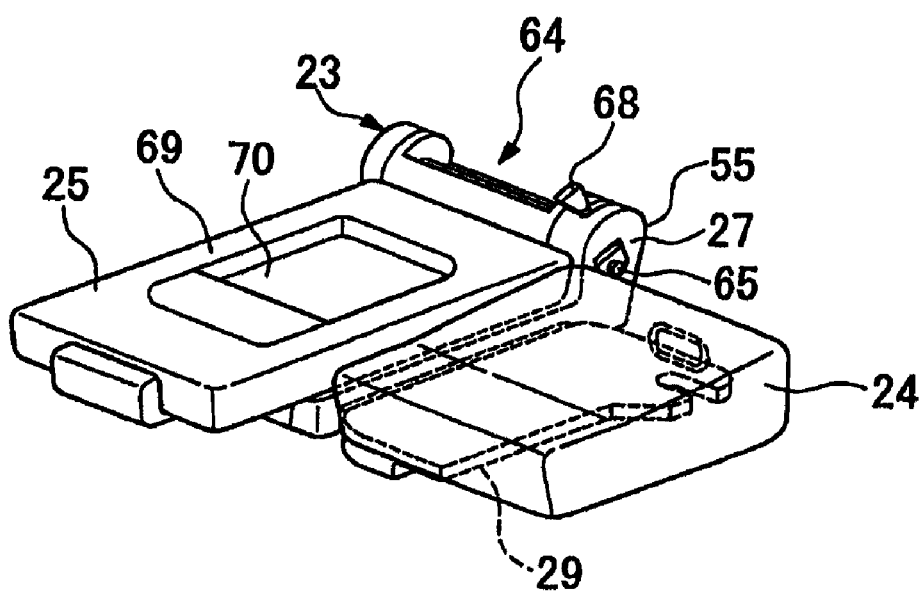
FIG. 13 is a perspective view of the central seat to which the embodiment of the present invention is applied, shown in a state stored in the recess.

At this time, the cushion-detached body 64 is stored with its thickness direction directed in the vertical direction, and likewise the seat cushion 24, which is juxtaposed with the cushion-detached body 64, is also stored with its thickness direction directed in the vertical direction. Furthermore, as shown in FIG. 13, the cushion-detached body 64 and the seat cushion 24 are stored with their lengthwise directions disposed parallel to each other, i.e., disposed in the front and back direction. In addition, at this time the seat cushion 24 is placed on the seat leg 29 extending laterally outwardly from the seat base 23 of the cushion-detached body 64, and in this condition the seat cushion 24 and the cushion-detached body 64 have substantially the same height and are fully stored in the recess 74.

Then, the rear plate 79 of the floor lid 76, after completion of accommodation of the seat cushion 24 and the cushion-detached body 64 into the recess 74, is rotated downwardly so as to fully close the upper opening 75 of the recess 74 as shown in FIG. 2.

As described hereinabove, according to the present embodiment, after removal of the central seat 17 from the vehicle floor F, the seat cushion 24 detachably mounted on the seat base 23 is removed therefrom to provide the cushion-detached body 64, the backrest 25 is folded to the seat base 23, and the foldable seat legs 28 and 29 are folded at the underside of the seat base 23 such that the cushion-detached body 64 has a thickness substantially reduced by the amount corresponding to the thicknesses of the seat legs 28 and 29 and the seat cushion 24. The cushion-detached body 64 and the removed seat cushion 24 are then accommodated in a juxtaposed manner in the recess 74 provided in the vehicle floor F which is limited in height. Thus, the central seat 17, when not in use, may be removed from the vehicle floor F and be efficiently stored inside the vehicle. Note that an efficient storing inside the vehicle is likewise possible in the case where the foldable seat legs 28 and 29 are eliminated from the underside of the seat base 23 and the seat cushion 24 is made thicker for that.

Furthermore, the seat cushion 24, and the seat base 23 with the backrest 25 folded and the seat legs 28 and 29 folded, i.e., the cushion-detached body 64 are juxtaposed with their thickness directions directed in the vertical direction to be stored in the recess 74 provided in the vehicle floor F that is limited in height. Thus, the removed central seat 17 may further be efficiently stored inside the vehicle.

In addition, with the seat cushion 24 mounted on the seat base 23, because the rotation shaft 65 of the backrest 25 is located at the seat legs 28 and 29 side or at a lower side of the bearing surface of the seat cushion 24, the total thickness of the seat base 23 with the seat cushion 24 removed therefrom and the backrest 25 folded on the seat base 23, i.e., the thickness of the cushion-detached body 64 can be made smaller. Thus, the removed central seat 17 may further be efficiently stored inside the vehicle.

In addition, because the pair of seat legs 28 and 29 are rotated in the same direction to be folded, they can be folded without interference with each other, irrespective of their length. Thus, the removed central seat 17 may further be efficiently stored inside the vehicle.

Furthermore, because the tray 70 is provided on the back 69 of the backrest 25, with the central seat 17 maintained on the vehicle floor F, if the seat cushion 24 is removed from the seat base 23 and the backrest 25 is folded on the seat base 23, the tray 70 on the back 69 of the backrest 25 faces upwardly and is adapted for use. Because the seat cushion 24 is thus removed before the backrest 25 is folded, the backrest 25 and the tray 70 become stable, allowing things to be reliably placed on the tray 70.

Figure 14:
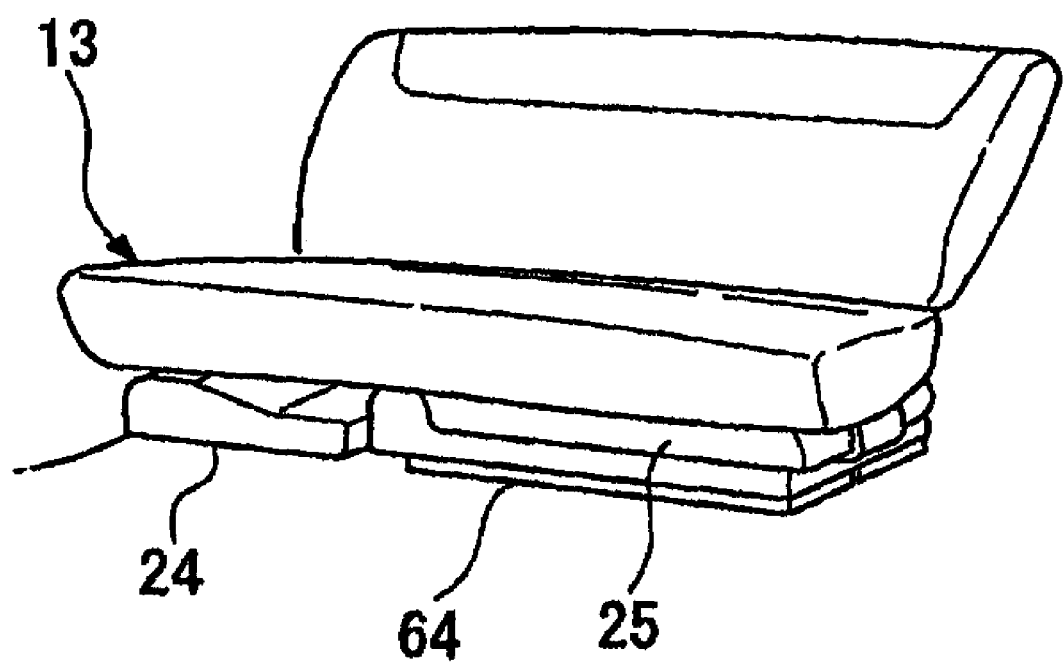
FIG. 14 is a perspective view of the central seat to which the embodiment of the present invention is applied, shown in a state stored under another seat.

As mentioned above, after removal of the central seat 17 from the vehicle floor F, the seat cushion 24 is removed to provide the cushion-detached body 64, the backrest 25 is allowed to fall forwardly to be folded, and the seat legs 28 and 29 are rotated relative to the seat base body 27 into the folded position. Note that thereafter it is also possible, as shown in FIG. 14, to store the cushion-detached body 64 and the seat cushion 24 in a juxtaposed manner under the third seat 13, i.e., between the seat and the vehicle floor F.

Also in this case, the cushion-detached body 64 is stored with its thickness direction directed in the vertical direction, and likewise the seat cushion 24 that is juxtaposed beside the cushion-detached body 64 is stored with its thickness direction directed in the vertical direction. In addition, the cushion-detached body 64 and the seat cushion 24 are stored with their lengthwise directions directed in the same direction, i.e., in the left and right direction.

In this way, the cushion-detached body 64 and the seat cushion 24 may be stored in the area under the third seat 13 that cannot have a large height, making it possible for the removed central seat 17 to be efficiently stored inside a vehicle as in the previous example. Here, in the case of storing under the seat, it is also possible to rotate and fold the seat legs 28 and 29 of the seat base 23 in opposite directions such that their front ends come closer to each other.

A second embodiment of the present invention will be described with reference mainly made to FIGS. 15 through 18, centering on different points as compared with the first embodiment. In these figures, like parts or elements to the first embodiment will be given like reference characters and their description will be omitted.

In the second embodiment, either one of the lateral seats 15 and 16 in the second row of seats 12, disposed on both sides of the central seat 17 in a width direction of the vehicle, more specifically the right-side lateral seat 15 in the present embodiment is made changeable in its position in the width direction of the vehicle.

At the positions of the vehicle floor F corresponding to the lateral seat 15 and the central seat 17, two anterior locking elements 100 and 101 are respectively provided which are shaped like a bent rod and which are at the same position in the front and back direction and are slightly spaced from each other in the width direction of the vehicle, each of the locking elements 100 and 101 having both ends rising from the vehicle floor F and an intermediate portion extending long in the width direction of the vehicle to connect the both ends of the locking element. In addition, backwardly of these anterior locking elements 100 and 101, five posterior locking elements 102 to 106 are provided which are at the same position in the front and back direction and spaced from one another in the width direction of the vehicle, each of the locking elements 102 to 106 having both ends rising from the vehicle floor F and an intermediate portion extending shortly in the width direction of the vehicle to connect the both ends of the locking element.

The lateral seat 15 has a pair of seat legs 110 and 111 extending downwardly from the right and left sides of the seat cushion 20 and is secured at the seat legs 110 and 111 to the vehicle floor.

The seat leg 110 of the lateral seat 15 is provided at a front portion thereof with a hook 112 engageable with the anterior locking element 100 and at a rear portion with a locking mechanism 113 releasably coupleable with the posterior locking elements 102 and 103. Here, the seat leg 110 of the lateral seat 15 is fixed to the vehicle floor F by, with its hook 112 locked with the anterior locking element 100, pressing the locking mechanism 113 against the posterior locking element 102 or the posterior locking element 103 from above into coupling therewith. The locking mechanism 113 is releasable from the coupling with the posterior locking element 102 or the posterior locking element 103 by manually pulling a disconnection lever (not shown).

The seat leg 111 of the lateral seat 15 is provided at a front portion thereof with a hook 114 engageable with the anterior locking element 101 and at a rear portion with a locking mechanism 115 releasably coupleable with the posterior locking element 104 or the posterior locking element 106. Here, the seat leg 111 of the lateral seat 15 is fixed to the vehicle floor F by, with its hook 114 locked with the anterior locking element 101, pressing the locking mechanism 115 against the posterior locking element 104 or the posterior locking element 106 from above into coupling therewith. The locking mechanism 115 is releasable from the coupling with posterior locking element 104 or the posterior locking element 106 by manually pulling a disconnection lever (not shown).

Figure 15:
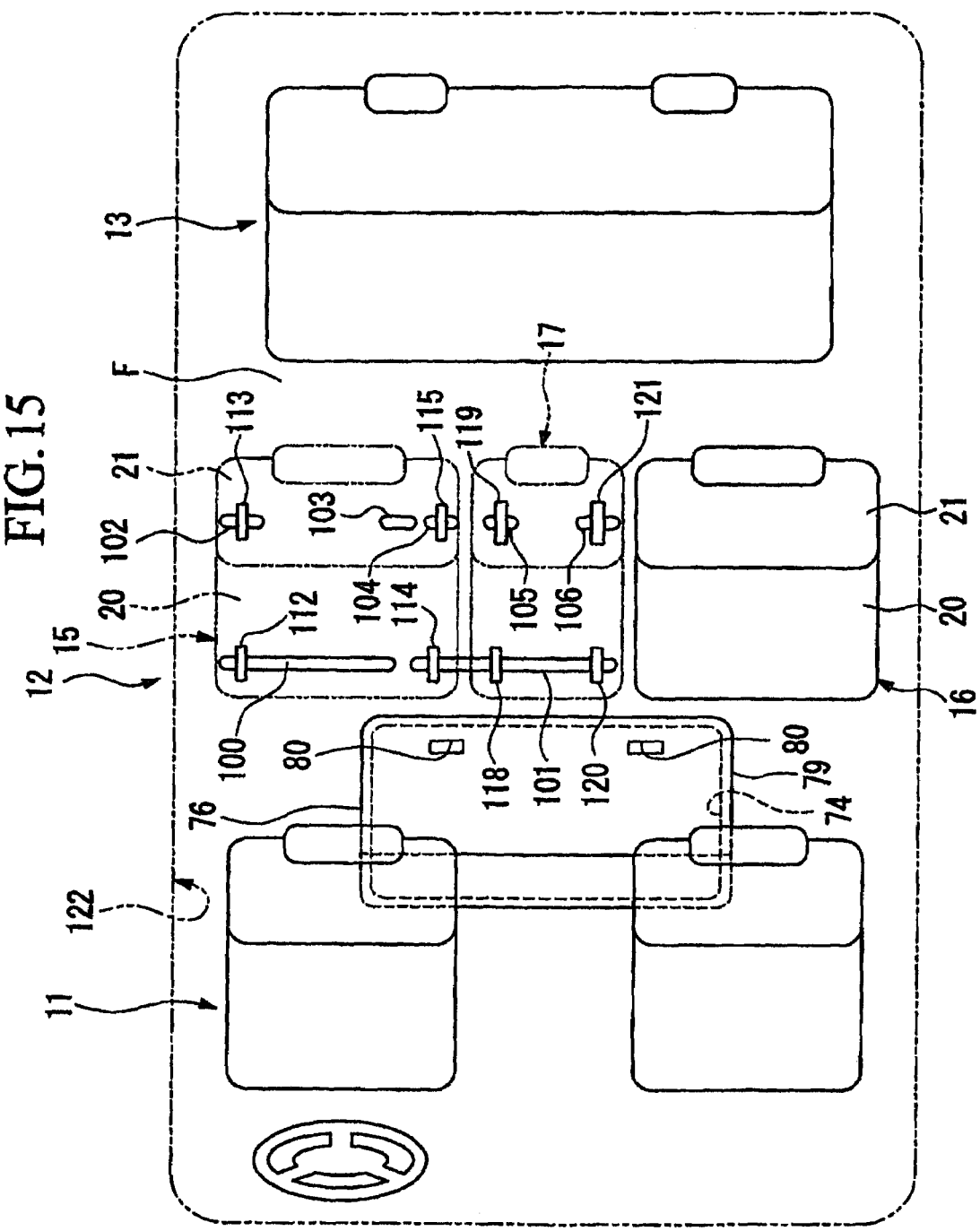
FIG. 15 is a plan view of a vehicle interior to which a second embodiment of the present invention is applied, shown with a right-side lateral seat in a spaced fixed position and the central seat mounted.
Figure 17:
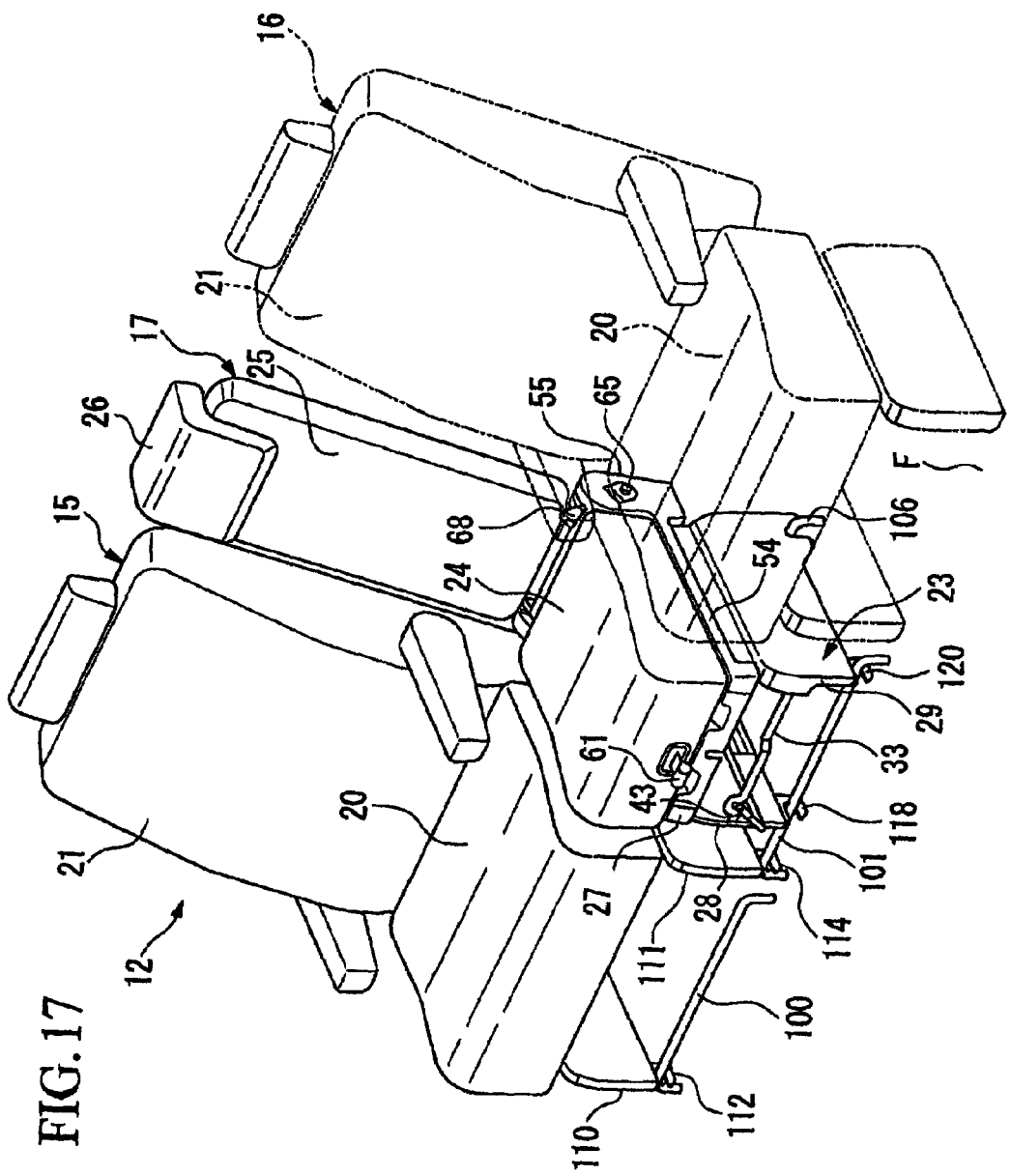
FIG. 17 is a perspective view of the second row of seats including the central seat to which the embodiment of the present invention is applied, shown with the right-side lateral seat in the spaced fixed position and the central seat mounted.

If, with the right-side seat leg hook 112 locked with a right end portion of the right-side anterior locking element 100 fixed to the vehicle floor F and with the left-side seat leg hook 114 locked with a right end portion of the left-side anterior locking element 101 fixed to the vehicle floor F, the right-side seat leg locking mechanism 113 couples with the right end posterior locking element 102 fixed to the vehicle floor F and the left-side seat leg locking mechanism 115 couples with the third posterior locking element 104 from right fixed to the vehicle floor F as shown in FIGS. 15 and 17, the lateral seat 15 is fixed to the vehicle floor F in a spaced position from the left-side lateral seat 16. This position will be referred to as a spaced fixed position.

Here, the central seat 17 is the same in structure as in the first embodiment and has the seat cushion 24 and the pair of seat legs 28 and 29 extending downwardly from the right and left sides of the seat cushion 24. The seat leg 28 is provided at a front portion with a hook 118 engageable with the anterior locking element 101 and at a rear portion with a locking mechanism 119 releasably coupleable with the posterior locking element 105. The seat leg 29 of the central seat 15 is provided at a front portion with a hook 120 engageable with the anterior locking element 101 and at a rear portion with a locking mechanism 121 releasably coupleable with the posterior locking element 106. Note that although the reference characters used in the second embodiment for designating the central seat anterior locking elements 118 and 120 and locking mechanisms 119 and 121 are different from those used in the first embodiment for expediency's sake, they are the same in structure.

When the lateral seat 15 is in the spaced fixed position as mentioned above, the central seat 17 is disposed between the lateral seat 15 and the lateral seat 16 to be fixed to the vehicle floor F. In other words, with the right-side seat leg hook 118 locked with the left-side anterior locking element 101 fixed to the vehicle floor F, at a position leftward of the position whereat the hook 114 of the lateral seat 15 locks with the locking element 101, and with the left-side seat leg hook 120 locked with the left-side anterior locking element 101 at a left end position, the right-side seat leg locking mechanism 119 is pressed against from above and couples with the fourth posterior locking element 105 from right fixed to the vehicle floor F, and the left-side seat leg locking mechanism 121 is pressed against from above and couples with the posterior locking element 106 from right fixed to the vehicle floor F, so as to lock the central seat 17 to the vehicle floor F. In this state, three occupants may sit down on the three seats of the lateral seats 15 and 16 and the central seat 17.

Figure 16:
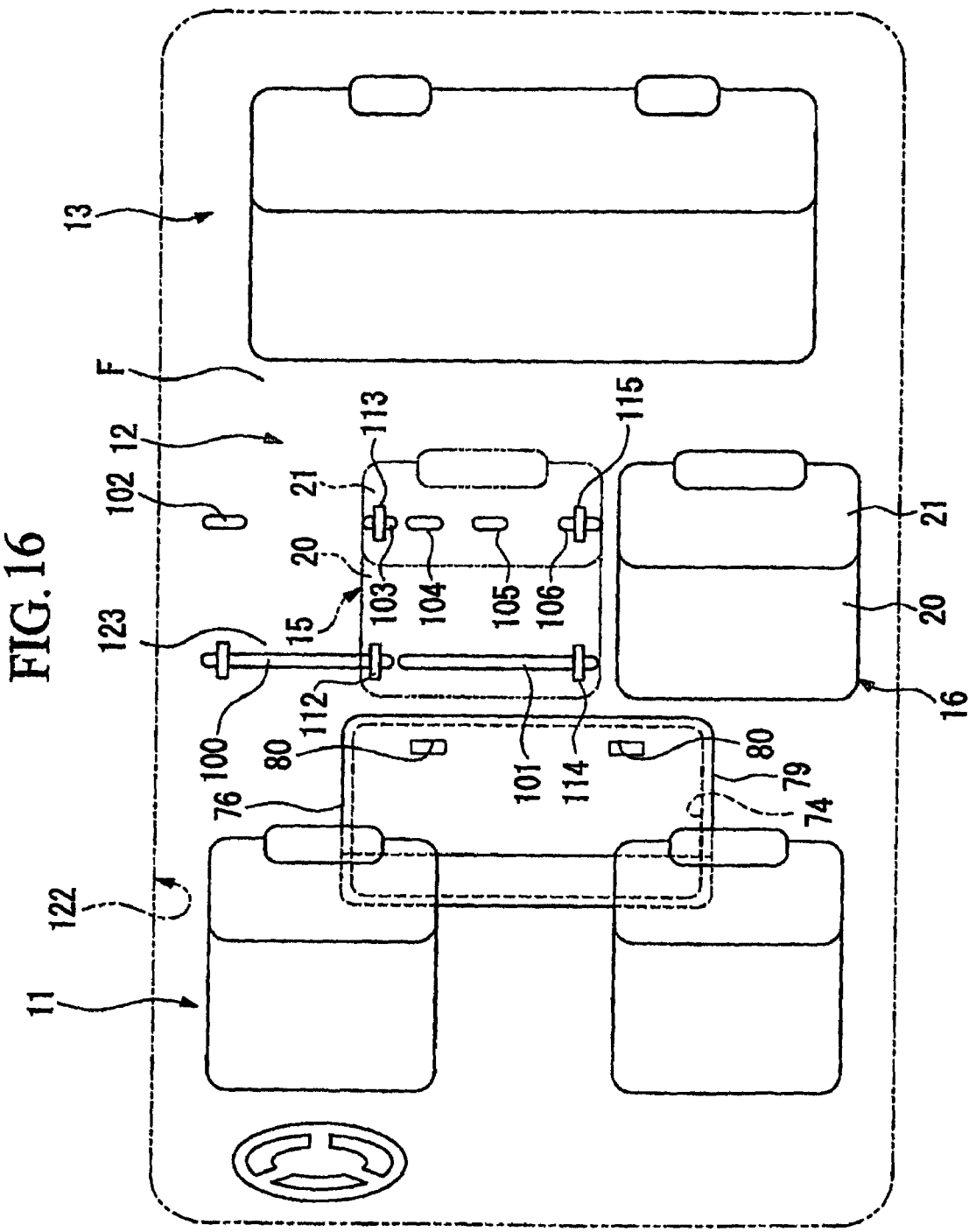
FIG. 16 is a plan view of the vehicle interior to which the embodiment of the present invention is applied, shown with the central seat removed and the right-side lateral seat in a closer-moved fixed position.
Figure 18:
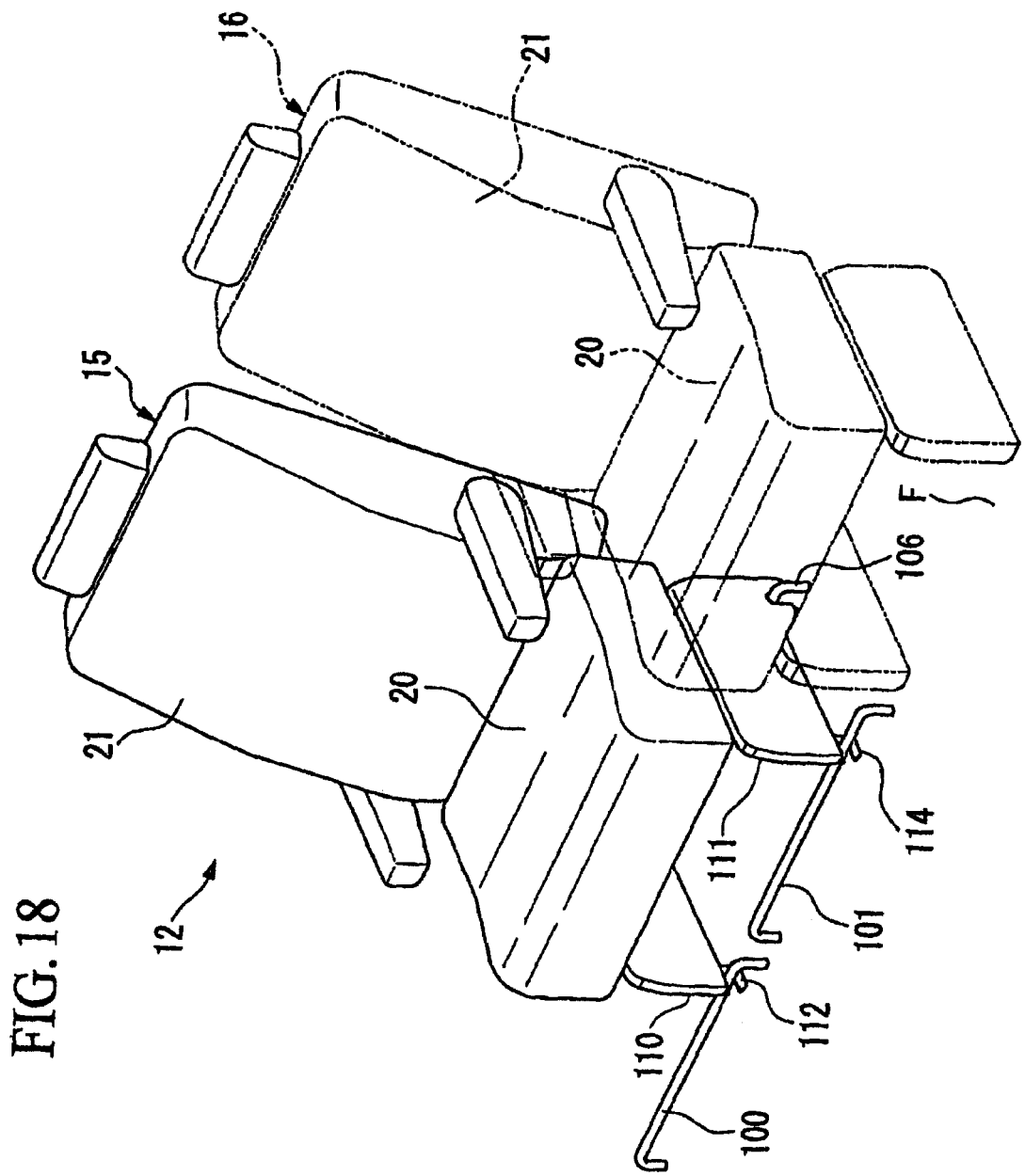
FIG. 18 is a perspective view of the second row of seats including the central seat to which the embodiment of the present invention is applied, shown with the central seat removed and the right-side lateral seat in the closer-moved fixed position.

By unlocking the locking mechanisms 119 and 121, the central seat 17 is detached from the vehicle floor F and removed from between the lateral seats 15 and 16. If, after removal of the central seat 17, the right-side seat leg locking mechanism 113 of the lateral seat 15 is coupled with the second posterior locking element 103 from right fixed to the vehicle floor F, and the left-side seat leg locking mechanism 115 is coupled with the fifth posterior locking element 106 from right fixed to the vehicle floor F, with the right-side seat leg hook 112 locked with the right-side anterior locking element 100 fixed to the vehicle floor F, at a left end position thereof, and with the left-side seat leg hook 114 locked with the left-side anterior locking element 101 fixed to the vehicle floor F, at a left end position as shown in FIGS. 16 and 18, the lateral seat 15 is fixed to the vehicle floor F in a closer-moved position to the left-side lateral seat 16. This position will be referred to as a closer-moved position. In this state, two occupants may sit down on the two seats of the lateral seats 15 and 16. Moreover, as a result of the position change of the lateral seat 15 toward the lateral seat 16, a relatively large space 123 is secured on the side of the lateral seat 15 opposite the lateral seat 16 that allows a front and back walk-through of occupants inside the vehicle 22.

In order to move the lateral seat 15 between the spaced fixed position and the closer-moved position, the posterior locking mechanisms 113 and 115 are unlocked, and the lateral seat 15 is slightly raised at the rear. The hooks 112 and 114 are guided along the anterior locking elements 100 and 101, with the hooks 112 and 114 maintained locked with the anterior locking elements 100 and 101, so as to slide the lateral seat 15 in the width direction of the vehicle.

According to the second embodiment as described above, by locking one lateral seat 15 with the anterior locking elements 100 and 101 and with the posterior locking elements 102 and 104 in the spaced fixed position spaced apart from the other lateral seat 16, and by locking the central seat 17 with the anterior locking element 101 and with the posterior locking elements 105 and 106 and disposing the central seat 17 between the lateral seats 15 and 16 on both sides in the width direction of the vehicle, it becomes possible for three occupants to take their respective seats in this row. On the other hand, by detaching the central seat 17 from the anterior locking element 101 and the posterior locking elements 105 and 106, and by guiding one lateral seat 15 along the anterior locking elements 100 and 101 toward the other lateral seat 16 and locking the one lateral seat 15 with the anterior locking elements 100 and 101 and with the posterior locking elements 103 and 106 in the closer-moved position, it becomes possible for two occupants to take their respective seats and for occupants to walk through the space 123 formed inside the vehicle cabin 122, on the side of the one lateral seat 15 opposite the other lateral seat 16. In addition, the central seat 17 is lockable with the anterior locking element 101 along which one lateral seat 15 is guided in the width direction of the vehicle and with which the one lateral seat 15 locks to be put in position. Thus, the anterior locking element 101 serves the function of locking and guiding the lateral seat 15 as well as the function of locking the central seat 17, thereby leading to a reduction in the cost.

While in the second embodiment a description has been made of the case where the right-side lateral seat 15 is changeable in position in the width direction of the vehicle, it is of course also possible to make the left-side lateral seat 16 changeable in position in the width direction of the vehicle.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as limited by the foregoing description and is only limited by the scope of the appended claims.

The invention claimed is:

1. A vehicle seat comprising:
   a seat base configured to detachably and reattachably mount on a vehicle floor, said seat base including a base portion;
   a seat cushion detachably provided on the base portion; and
   a backrest;
   wherein the base portion contacts said backrest when said seat cushion is detached and said backrest is folded;
   wherein said seat base further includes:
      a backrest support portion provided at a rear part of said seat base that foldably supports said backrest;
      a first foldable leg, including:
         an upper part rotatably attached to a first side of said base portion, and
         a lower part, including a first locking mechanism that detachably and reattachably secures to said vehicle floor, wherein when said first locking mechanism is secured to said vehicle floor, said first foldable lea extends vertically towards said vehicle floor; and
      a second foldable leg, including:
         an upper part rotatably attached to a second side of said base portion,
         a lower part, including a second locking mechanism that detachably and reattachably secures to said vehicle floor, wherein when said second locking mechanism is secured to said vehicle floor, said second foldable lea extends vertically towards said vehicle floor, and
         a placement surface provided on said second foldable leg for placing said seat cushion that is detached from said base portion, wherein when said second foldable leg is folded with respect to said seat base, so as to be positioned at a side of said seat base and substantially parallel to said seat base, said placement surface faces upward.

2. The vehicle seat according to claim 1, further comprising:
   a connection link that is rotatably connected to said first foldable lea and said second foldable leg, wherein the connection link extends from said first foldable lea to said second foldable leg and substantially parallel to said vehicle floor, wherein said first and second foldable legs are rotatable in a same folding direction.

3. The vehicle seat according to claim 2, further comprising a restriction part that prevents rotation of said first and second foldable legs in one direction, while allowing rotation of said first and second foldable legs in another direction.

4. The vehicle seat according to claim 1, wherein when said seat cushion is removed from said seat base and said backrest is folded so as to form a cushion-removed-body, the height of said cushion-removed-body and the height of said seat cushion placed on said placement surface of said foldable leg are substantially the same.

5. The vehicle seat according to claim 1, further comprising a foldable link,
   wherein a first end of said foldable link is connected rotatably to said first foldable leg,
   wherein a second end of said foldable link is connected rotatably to a lower part of said seat base at a portion that is substantially middle position in a left-right direction of said seat base.

6. The vehicle seat according to claim 1, further comprising:
   a cushion-locking mechanism provided at a lower surface of said seat cushion;
   a locking portion provided at an upper surface of said base portion, that is lockable with said cushion-locking mechanism;
   an engagement hook provided at a rear part of said seat cushion; and
   an engagement recess formed at a front surface of said backrest support portion that accepts engagement with said engagement hook.

* * * * *